Figure 4:
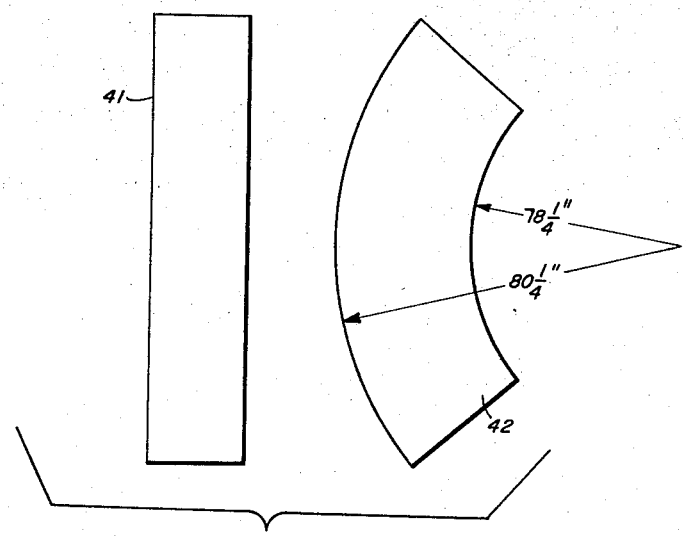

Feb. 23, 1960  W. B. LEW  2,926,066
RUBBER BOOT METHOD OF BEARING PRESERVATION
Filed Jan. 18, 1957  3 Sheets-Sheet 1
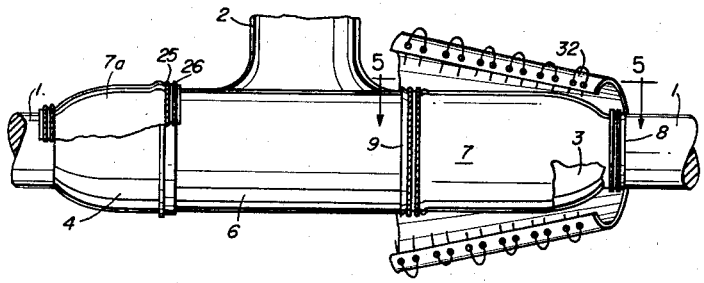
Fig. 1
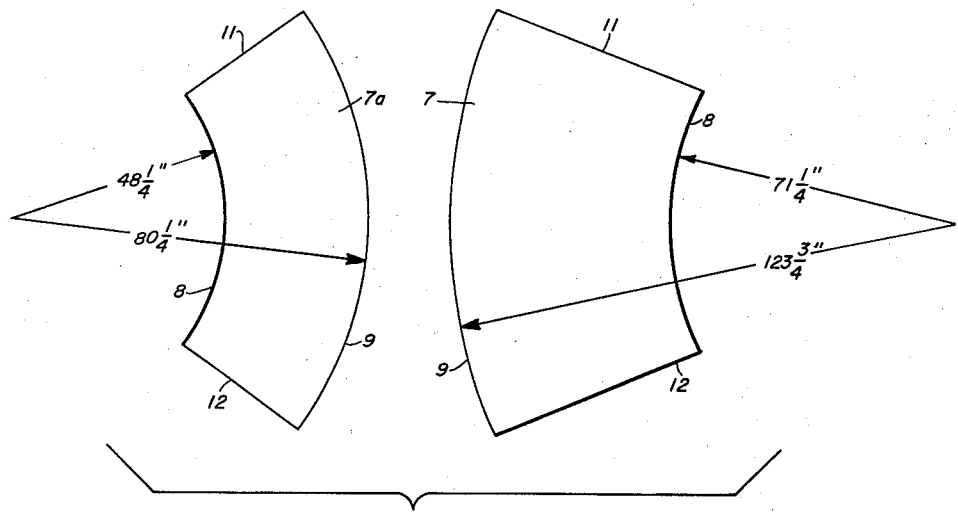
Fig. 2
Fig. 3
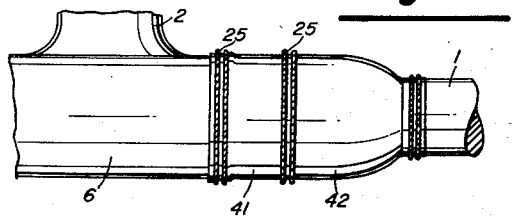
INVENTOR.
WAH B. LEW
BY
ATTORNEYS Feb. 23, 1960   W. B. LEW   2,926,066
RUBBER BOOT METHOD OF BEARING PRESERVATION
Filed Jan. 18, 1957   3 Sheets-Sheet 2

INVENTOR.
WAH B. LEW
BY
ATTORNEYS

Feb. 23, 1960   W. B. LEW   2,926,066
RUBBER BOOT METHOD OF BEARING PRESERVATION
Filed Jan. 18, 1957   3 Sheets-Sheet 3

INVENTOR.
WAH B. LEW
BY
ATTORNEYS

United States Patent Office 2,926,066
Patented Feb. 23, 1960

2,926,066
RUBBER BOOT METHOD OF BEARING PRESERVATION

Wah B. Lew, Bremerton, Wash., assignor to the United States of America as represented by the Secretary of the Navy Application January 18, 1957, Serial No. 635,560
8 Claims. (Cl. 21—2.5)

(Granted under Title 35, U.S. Code (1952), sec. 266)

The invention described herein may be manufactured and used by or for the Government of the United States of America for governmental purposes without the payment of any royalties thereon or therefor.

This invention relates to the preservation maintenance of various structural parts and, more particularly, to methods for sealably and anti-corrosively protecting underwater elements such as the bearings of ship propulsion shafts.

Although, as later will become apparent, the present inventive principles can be applied in any number of different situations, the specifically contemplated use is that of the preservation of ship propulsion shafts during the periods that these ships are deactivated or otherwise placed in a reserve or stand-by status. There are, of course, many ships in the Reserve Fleet of the U. S. Navy and it is highly important to national security that these ships not only be carefully preserved but that the preservation methods used permit expeditious activation when needed. For this purpose, many different techniques relating to individual parts have been developed and, of course, the rather difficult problem of preventing electrolytic deterioration of underwater parts, such as the propulsion shafts, has received considerable attention.

This propulsion shaft problem has been particularly perplexing not only because an effective and practical sealing means must be provided, but also the means provided must be of such a nature as to render the task of removal both a simple one and one which can be performed without the long delays incident to dry-docking. As a further consideration, the sealing means for such propulsion shafts should be of a type which can be installed at any Naval activity or, in other words, a type which does not require particular skills or scientific techniques such as are available only at a few selected activities.

Apparently, because of these considerations, as well as a number of others involving cost and time factors, the various suggestions for preserving the bearings have been found objectionable. Exemplary of these various suggestions has been the thought of first applying an uncured rubber compound to the part to be protected and then taping the compound with a wet tape which, as it shrinks, forces the rubber into position. Finally the compound is secured in place. Although such a method is entirely effective, it has one pronounced disadvantage in that the techniques involved are for the most part beyond the capacity of the majority of the Naval activities. Another suggestion has been that of spirally winding strips of rubber about the portions to be protected and cementing these spiral strips in place. This idea also has some merit although it was found to result in considerable leakage unless extreme care is taken during the winding and unless the winding is done by special techniques available only to skilled and trained personnel. Further, as will be appreciated, the task of removing either of these suggested sealing means involves considerable difficulty for divers who, of course, must perform the job beneath the water. This fact is dissuasive because, if for no other reason, the scarcity of divers demands that the removal be capable of accomplishment with a minimum of time and effort.

It is, therefore, among the objects of this present invention to provide a means for preservatively protecting structural parts, the means being entirely effective as a seal and being capable of expeditious and simple application and removal.

A related object is to provide a sealing means which can be expeditiously removed by divers operating beneath the water.

A further object is to provide a means, in accordance with the above object means, the application of which does not require any special technique or equipment.

Among a number of other objects are those concerned particularly with such practical considerations as the expense involved, the time and effort required both for application and for removal, and the availability of the materials used.

In the general manner, these and other objects are accomplished by wrapping a flexible rubber-like sheet about the bearing or other structural parts to be protected. Preferably, the sheet is specially dimensioned with respect to the particular bearing to be protected so as to form a tube or sleeve which, in effect, bridges the bearing to the extent that the end portions of the sheet are closely fitted over adjoining structural parts of relatively large diameter while the portion extending over the bearing is radially-spaced from the bearing. Also, the ends of the tube which are fitted over the adjoining parts are continuously bound to these parts. Most suitably, cables are used for this purpose, the cables being provided with buckles capable of being tensioned so as to cause the cables to compress the rubber-like tube and in effect form a gasket-like sealing medium. The longitudinal meeting edges of the tube, as would be expected, are continuously bonded together and in the dimensioning of the tube sufficient overlap is provided for this bonding operation.

With the tube so mounted in its bridging disposition, a casing member is wrapped about it so that, by way of analogy, the arrangement resembles the ordinary automobile tire to the extent that the seal is formed both by an inner tube and a casing. In further analogy, the casing and inner tube are provided with means for admission of fluid into the tube, although in the present structure the tube fluid is a preservative or anti-corrosive fluid and this fluid is admitted only in sufficient amount to fill the tube. As will be appreciated, such a sealing means, which is familiarly known as a rubber boot, is one which is quite easily applied and even more easily removed even by divers operating under water. In the removal, it is necessary only to remove the casing, which may be laced together at its meeting edges and then to cut away the portion of the boot which bridges the bearing. In other words, the end portions of the boot which are compressed as gaskets by the cables can be left in place with no ensuing difficulties.

Another important feature of the invention resides more directly in a method of applying the boots on such structure as normally is encountered in propulsion shaft maintenance. Thus, for example, most propulsion shafts are supported by struts and usually fairwater structure is provided between the strut collar and the propulsion shaft itself. Such fairwaters usually are conical members providing a progressively decreasing diameter from the strut collar to the shaft for the obvious purpose of streamlining or reducing water friction. Further, these fairwaters are used in various locations along the shaft such as between the shaft and the propeller hub and also at the location of the stern tube. In mounting the rubber boot on such fairwater structure, the method of the present invention contemplates first wrapping the dimensioned boot over the shaft itself which, of course, is of lesser diameter than the progressively increasing diameters of the fairwater. With the boot so wrapped, the lapped meeting edges are bonded together and, depending upon environmental conditions, these edges either may be cemented or they may be bonded by rubber-curing techniques which will be described later. Having formed the tube about the shaft, the next operation involves pulling the tube up and over the fairwater into its sealing disposition or, in other words, into a position at which one of its ends extends over the strut collar and the other over the shaft itself. As will be appreciated, the bearing to be protected lies beneath the fairwater and, depending upon the situation encountered, it may be necessary to drill the fairwater so as to permit access of the preservative fluid to the bearing. The ends of the tube then are compressed by cables or other suitable means to the strut collar and to the shaft following which the casing is applied and the preservative fluid admitted in the manner previously described to provide what has been found to be a thoroughly effective seal.

In the above description, as well as that to follow, the particular application of the inventive principles are with respect to propulsion shaft preservation. However, it is most important to note that the inventive principles obviously are of such a nature as to be applicable in any number of different situations so that there is no intention of limiting the invention to any one specific job.

Figure 5:
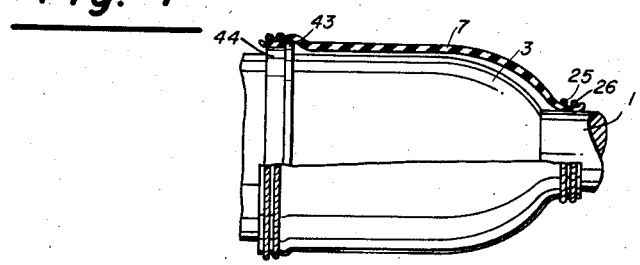
Figure 6:
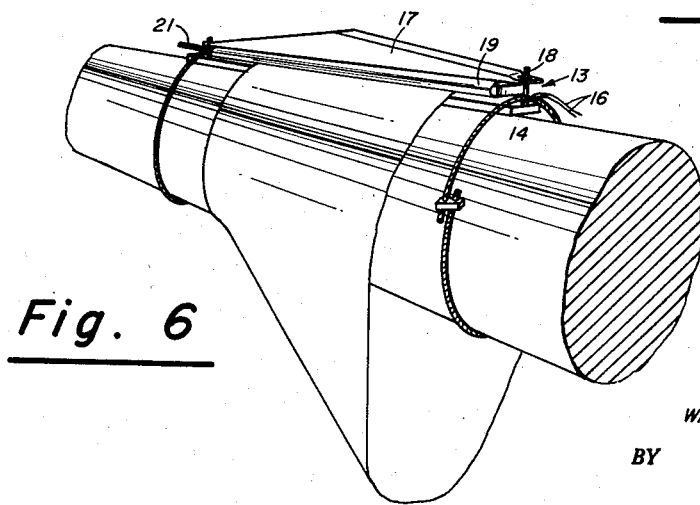
Figure 7:
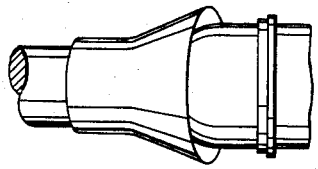
Figure 8:
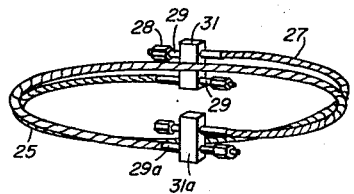
Figure 9:
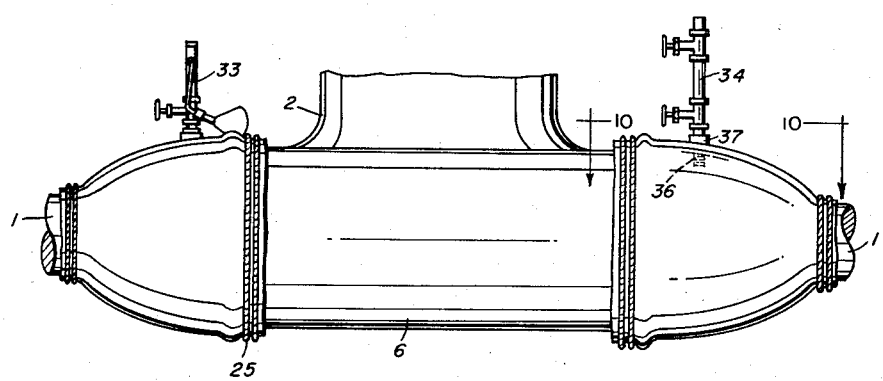
Figure 10:
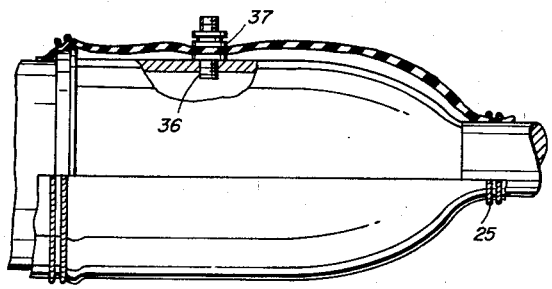

Various forms of the invention are illustrated in the accompanying drawings of which Fig. 1 is a side elevation of a section of a propulsion shaft illustrating the application of protective boots to strut fairwaters, the casing for the boots being shown partially wrapped about one of the inner tubes; Fig. 2 a layout of the rubber sheets before application to the fairwaters of Fig. 1; Fig. 3 a view similar to Fig. 1 showing a modified type of boot; Fig. 4 a layout of the sheets before application to the fairwater of Fig. 3; Fig. 5 a section taken along lines 5—5 of Fig. 1; Figs. 6 and 7 side elevations illustrating two steps performed in the method of invention; Fig. 8 a perspective of a special cable used to bind the sheets; Fig. 9 a side elevation showing one manner in which the tube of the boot can be filled with preservative fluid, and Fig. 10 a section along lines 10—10 of Fig. 9.

Referring to Fig. 1 of the drawings, the structure illustrated is that of a section of a ship's propulsion shaft and it includes a shaft member 1 supported at spaced intervals by struts generally indicated by the numeral 2. Fairwater members, such as fairwaters 3 and 4, are employed to streamline the shaft and for this purpose, the fairwaters are conical members the ends of which are rigidly attached to shaft 1 and to a collar member 6 of the strut. The shaft, of course, is rotatably driven to drive the propeller and the shaft bearings that permit rotations are covered by these fairwaters. Also, as will be recognized by persons familiar with propulsion shafts, the illustrated strut structure is that of the intermediate strut, although the main strut which supports the propeller hub presents substantially the same situation in that it also requires a fairwater to provide a progressively increasing diameter between the shaft and the hub. So far as fairwater structure is concerned, the inventive principles apply identically both to the intermediate and to the main structure.

It can be considered for descriptive purposes that there are two phases to the invention, one being the boot structure itself which provides the seal for the propulsion shaft bearings, and the other a particular method by which this boot structure can be applied to the fairwaters that cover the bearings. However, the ensuing description will be primarily concerned with the method because, as will become apparent, the structural elements can be identified and defined in the order that they are brought into use. The first step providing a seal for protecting the bearing members of fairwater 3 is that of forming a sheet, such as sheet 7 illustrated in Fig. 2, this sheet most suitably being formed of a rubber-like material specially contoured to fit smoothly and closely about the conical surfaces of the fairwater. Customarily, rubber sheet 7 is cut out of a rectangular piece of rubber according to measurements made on the fairwater itself so that, as illustrated in Fig. 2, a layout of the sheet shows it to have arcuate end edges 8 and 9 and tapered straight line side edges 11 and 12. Also, for purposes to be described, in dimensioning and cutting out the sheet, an allowance is made to permit a three-inch overlap or seam when side edges 11 and 12 are positioned about the fairwater. It further is to be noted that the strut and fairwater structure shown in Fig. 1 requires a separate sheet 7a for what may be considered as the aft fairwater 4 of the intermediate strut. However, this sheet is formed and applied in the same manner as sheet 3 so that no further specific reference to it should be necessary.

With sheet 7 so dimensioned and formed, the next step resides in wrapping it about shaft 1 which, as has been noted has a lesser diameter than fairwater 3, and, the sheet being so wrapped, its meeting edges 11 and 12 may be overlapped, stitched together and then bonded to form an endless loose-fitting tube or sleeve.

Preferably, in bonding the edges of the sheet the three-inch overlap first is washed with a solvent following which a coat of cement is applied to both faces and the seam rolled to eliminate trapped air. The overlapped edges then are placed in a heating mechanism generally indicated by numeral 13 of Fig. 6 in which the cement is cured to effectively provide the necessary bond. Heater 13 is formed with a base plate 14 on which is mounted an electric heating element (not shown) provided with leads 16 adapted to be connected to a suitable source of electrical power. The heating element normally would be a coil mounted within the hollow center of the base plate and the plate usually is formed of several parts bolted together to facilitate disassembly and repair. Also, heater 13 has an upper plate 17 connected to base plate 14 by bolts 18 and between these two plates is disposed an air bag 19 also provided with an air supply conduit 21 by means of which the bag can be inflated for exerting pressure on the cemented seam of the overlap. As shown in Fig. 6, the overlapped seam is placed between base plate 14 and the air-bag following which the air bag is inflated and the heater energized to cure the cement.

As to the materials used both for the rubber-like sheet and for the cement, this will depend somewhat on how the bond of the overlapped edges is to be made. Thus, if the bond is to be formed by a heat-curing which utilizes the heat and pressure pads just described, the rubber sheet can be fabricated according to the following formulations:

| | |
|---|---:|
| GR–M | 100 |
| Zinc oxide | 10 |
| Litharge | 20 |
| Pelletex (SRF) | 50 |
| Neozone A | 2 |
| Stearic acid | 1 |
| Petroleum | 2 |
| Circo light process oil | 10 |
| Total | 195 |

Such a composition is known as D–82 sheet rubber and a suitable cement for such a rubber is as follows:

| | |
|---|---:|
| GR–M | 100 |
| Sulfur | 3 |
| Zinc oxide | 5 |
| XLC magnesia | 4 |
| P–33 (FT) | 100 |
| Neozene A | 2 |
| (ANT) T–8 solvent | 250 |
| Total | 564 |

This cement is known as H-8 cement and it is to be noted that, when this H-8 is used for the D-82 rubber, curing can be completed in about thirty minutes by holding the temperature in the range of 290 to 310°. Other materials may vary the curing time or temperature in a manner to be determined experimentally or according to manufacturer's data. After the curing period is completed, the electric circuit is opened and the heater allowed to cool before it is removed from the boot.

As indicated, heat-curing is not required when ambient conditions permit use of a cold cementing operation and when curing time is of no particular concern. Thus, it is possible to use a cold cured cement such as a commercially available cement known as GACO Cold Bond cement N-29 accelerated with N-39, the material being combined in the ratio of 16 parts N-29 to one part N-39. In this cold curing method, however, it is preferable to use a particular rubber sheet fabricated from a material known as GACO neoprene N-3S and best results have been obtained using a sheet thickness of 1/8". In comparison, the heat cured cementing procedure most suitably uses a 3/16" sheet stock formed in accordance with the above formulation although these details of course can be varied to suit particular circumstances.

After the curing has been completed by either of the described procedures, the boot is ready to be installed on the fairwater and, in a general manner, this is accomplished simply by pulling the boot up and over the fairwater (Fig. 7) into a position in which its end edge 9, for example, covers the outer cylindrical edge of strut 2 while its other edge 8 covers the cylinder of shaft 1. With the cylindrical edges so covered, an effective seal is provided for the bearing by utilizing cable clamps 25 (Fig. 5) to compress edges 8 and 9 tightly against the surfaces of the strut and the shaft so as, in effect, to provide a gasket at the edge of these endings.

For this purpose, it is preferred to use a specially-formed cable and clamp such as that shown in Fig. 8, this clamp including two steel cables 26 and 27 the end portions of which are provided with threaded members adapted to receive bolts 28. As seen, the end portions of cable 26 are extended through metal sleeves 29 mounted in a cable block 31, while the end portions of the other cable are identically mounted in a sleeve 29a extending through cable block 31a. Further, each of the cables makes a 360° turn so that, when the cables are drawn up tight by means of their end bolts 28, the rubber material beneath them is pressed evenly and tightly against the cylindrical edges both of the strut and the shaft.

As will be appreciated, the clamping of the end portions of the boot to the strut and shaft is an important part of the operation since it must provide an effective seal against the entrance of seawater to underlying parts. For this reason, it is quite desirable to have the end edges 8 and 9 of the boot fit smoothly and closely over the cylindrical edges of the shaft and strut so that, when the cables are drawn up, there will be a minimum of bunching such as might produce leaks. As a further precaution, it may be desirable to cement ends 8 and 9 to the surfaces that they cover although this cementing operation has not been found absolutely necessary.

After the end portions of the boot have been clamped by the particular cable clamp described, or such other means as may be considered preferable, the boot structure then is completed first by applying a non-stretchable casing, such as casing 32 (Fig. 1) and then by filling the interior of the tube with a preservative fluid which essentially is an anti-corrosive compound. One effective compound is sodium chromate and fresh water, the proportions being approximately one pound of sodium chromate to 10 gallons of water to provide 8,650 p.p.m. chromate solution. As will be appreciated, the preservative fluid is for the purpose of completely filling the interior of the fairwater so as to immerse the bearings to be protected and also to fill any void between the fairwater and the tube and to press the tube outwardly against the casing much in the same manner that the tube of an automobile tire is inflatably pressed against its casing.

To enable the tube and the fairwater to be filled with preservative fluid, certain vent and fill connector fittings 33 and 34 (Fig. 9) are utilized although any equivalent structure, of course, could be substituted. The type of fittings generally illustrated in Fig. 9 are formed of two parts 36 and 37, part 36 being threadably received in the fairwater and projecting upwardly through an opening made in the rubber boot. Part 37 in turn is threaded onto part 36 in the illustrated manner. As would be expected, it is necessary prior to pulling the boot over the fairwater to drill and tap the necessary hole in the fairwater for receiving the fitting 36.

As already indicated and as shown in Fig. 9, filling the boot best is accomplished by using both vent and fill fittings, the reason being that the filling is greatly facilitated by applying a vacuum capable of drawing in the preservative fluid. However, the vent connector is similar to the fill connector, the only difference being that vent connector 33 has a fitting capable of attachment to a vacuum pump while the fill connector 34 is attachable to a conduit leading from the source of the preservative fluid. The arrangement or positioning of the two connectors will depend on the particular fairwater structure encountered. In the illustrated structure, which is the same as that shown in Fig. 1, the vent filling 33 is mounted on the aft fairwater of the intermediate strut and the other fitting on the forward fairwater. With these fittings so arranged and connected, the entire area beneath fairwaters 3 and 4 can be filled with a preservative fluid so as to provide complete protection so long as the seals are maintained. The filling operation is quite simply accomplished applying approximately 3" of mercury pressure.

Preferably, the casing is applied before the preservative fluid is admitted, and generally it is formed of a non-stretchable material, such as a neoprene-coated glass cloth. Also, as indicated in Fig. 1, the casing is adapted to be tightly laced in position by means of some durable lacing, and, since the casing is used entirely for added strength and support, it does not need to provide any additional sealing function. With the casing so pulled around the tube, the preservative fluid can be admitted and the casing will cause the pressure exerted by the fluid to be evenly distributed without producing any sagging or weak portions which eventually might rupture.

Although the method and apparatus employed by the invention has been generally described, it will be appreciated that certain situations may be met in actual practice that will require particular modifications. One of these modifications is illustrated in Fig. 3 and, generally, it resides in the use of a two-part boot in place of the single boot which has been described. Such a two-part boot is particularly desirable when the fairwater has a contour that presents a hump or some other similar obstruction which would render the task of pulling the boot over the fairwater extremely difficult. When such a situation is encountered, it can be avoided simply by providing a two-part boot, one of these parts, such as part 41, being cylindrical while the other part 42 is of the conical form previously described. However, both of the parts are cemented together about the narrower shaft so that the principal advantage is in the fact that the cylindrical portion can be slipped far more easily over the fairwater area which it is intended to cover. Similarly, boots could be constructed of more than two parts if the situation should demand. However, it is necessary to separately clamp each of these parts to the fairwater so that additional cables 25 similar to those illustrated in Fig. 8 must be employed.

Another difficulty may arise when the strut or shaft are so uneven or pitted as to render it almost impossible to provide an effective seal. When such is the case, the situation easily can be remedied by spot-welding a metal ring 42 (Fig. 5) onto the strut or the shaft. Preferably, such a ring is provided with an inner lip 43 so as to prevent the cables from slipping off the ring when compressed, and such a lip can be provided by tack welding a rod onto the ring edge as indicated in the drawings. As stated, such rings are intended for use over uneven surfaces although they also can be used effectively in locations where there is insufficient cylindrical surface against which to clamp the ends of the boot. Thus, it frequently is found with some types of propellers that the roots of the propeller so merge into the propeller hub that there is insufficient cylindrical surface to permit effective use of the cables. With propellers of this particular type, it is necessary to spot-weld the ring to the hub and to compress the end of the hub against this ring. Here again, the ring is identical to the extent that it is provided with an inner restraining lip 43.

Briefly summarized, the method of the invention contemplates cutting a sheet of rubber-like material into a pattern dictated by the specific contour of the particular area to be covered. The cut sheet then is wrapped loosely about a smaller diameter shaft portion on which has been placed a suitable heater for expediting curing. An endless sleeve or tube then can be formed by curing and bonding the meeting edges of the sheet. Finally, the tube is pulled over the area to be protected, filled with a preservative fluid, and provided with a supporting casing. As to the structural features, these are not particularly concerned with the manner in which the boot is moved into its protective disposition and instead, they contemplate a tube which bridges in a sleeve-like manner the bearing to be protected, the tube having its ends compressed against adjacent surfaces to form gasket-like seals and the tube also being filled with a preservative fluid and provided with a casing adapted to support the filled tube in a non-sagging disposition. As will be appreciated, the method is particularly desirable for fairwater structure because, as probably has been recognized, in any such structure, it is necessary that the rubber-like tube be fitted quite closely over the contour of the fairwater to prevent its end portions from bunching unevenly when compressed by the cables. If the tube were not initially formed about a smaller diameter portion, such as the shaft, it would be extremely difficult to bond the overlapping edges and at the same time ensure such a close fit. In any event, the invention provides a highly efficient protective seal not only because the simplicity of its construction and relative ease of the application, but also because it can be applied without the employment of specialized skills and it can be removed quickly by underwater divers. The fulfillment of these conditions is necessary for any seal that is to be used in large quantities under the prevailing circumstances of the fleet.

Obviously many modifications and variations of the present invention are possible in the light of the above teachings. It is therefore to be understood that within the scope of the appended claims the invention may be practiced otherwise than as specifically described.

What is claimed is:

1. A method of mounting a rubber jacket in sealing disposition over a portion of a propulsion member having varying cross-sectional areas, the method including the steps of providing a sheet of rubber material dimensioned substantially in conformity with the peripheral contour of said portion to be jacketed, wrapping said sheet around a smaller cross-sectional portion of said propulsion member, overlapping and cementing the meeting edges of said wrapped sheet, pulling said cemented piece axially of said member into sealing disposition on said larger portion to be jacketed, and circumferentially clamping both ends of said disposed piece securely against said member.

2. A method of mounting a rubber sealing jacket on a propulsion member of progressively-increasing diameter, the method including the steps of wrapping a rubber sheet of material around a smaller diameter portion of said member, overlapping the meeting edges of the wrapped sheet, cementing said overlapped edges, pulling said cemented piece axially of said member over said progressively-increasing diameter and into sealing disposition, and circumferentially clamping both ends of the sealably disposed piece securely against said propulsion member.

3. A method for mounting a rubber sealing jacket on a fairwater member of progressively increasing diameters, the method including the steps of shaping a piece of rubber material in close conformity with said increasing diameters, wrapping said shaped piece around a smaller diameter portion of said member, overlapping the meeting edges of said wrapped piece, securely cementing together said lapped edges, pulling said cemented piece axially of said member over progressively-increasing diameter and into sealing disposition, and circumferentially clamping both ends of said sealably disposed piece securely against said structural member.

4. A method for mounting a rubber sealing jacket on a fairwater member of progressively increasing diameters, the method including the steps of shaping a piece of rubber material in close conformity with said increasing diameters, wrapping said shaped piece around a smaller diameter portion of said member, overlapping the meeting edges of said wrapped piece, securely cementing together said lapped edges, pulling said cemented piece axially of said member over progressively-increasing diameter and into sealing disposition, circumferentially clamping both ends of said sealably disposed piece securely against said fairwater member, and filling said jacket with a preservative fluid.

5. A method of mounting a rubber sealing jacket on a fairwater member of progressively-increasing diameters, the method including the steps of shaping a piece of rubber material in close conformity with said increasing diameters, wrapping said shaped piece around a smaller diameter portion of said member, overlapping the meeting edges of said wrapped piece, securely cementing said lapped edges, pulling said cementing piece axially of said member over progressively-increasing diameter and into sealing disposition, circumferentially clamping both ends of said sealably disposed piece securely against said fairwater member, filling said jacket with a preservative fluid, and partably binding a non-stretchable casing over said jacket.

6. A method for sealably protecting fairwater-covered shaft bearings, the method including the steps of shaping a rubber jacket in close conformity with said fairwater dimensions, wrapping the jacket over a portion of said shaft contiguous with said fairwater, overlapping the meeting edges of the jacket, cementing together said overlapped edges, pulling said cemented piece axially of the shaft and into sealing disposition, and circumferentially sealably clamping both ends of said sealably disposed piece to shaft portions on either side of said bearing.

7. A method for sealably protecting fairwater-covered shaft bearings, the method including the steps of shaping a rubber jacket in close conformity with said fairwater dimensions, wrapping the jacket over a portion of said shaft contiguous with said fairwater, overlapping the meeting edges of the jacket, cementing together said overlapped edges, pulling said cemented piece axially of the shaft and into sealing disposition, circumferentially sealably clamping both ends of said sealably disposed piece to shaft portions on either side of said bearing, and filling said jacket with a preservative fluid.

8. A method for sealably protecting fairwater-covered shaft bearings, the method including the steps of shaping a rubber jacket in close conformity with said fairwater dimensions, wrapping the jacket over a portion of said shaft contiguous with said fairwater, overlapping the meeting edges of the jacket, cementing together said overlapped edges, pulling said cemented piece axially of the shaft and into sealing disposition, and circumferentially sealably clamping both ends of said sealably disposed piece to shaft portions on either side of said bearing, binding a non-stretchable casing over said jacket, and filling said jacket and fairwater with a preservative fluid.

References Cited in the file of this patent

UNITED STATES PATENTS

| | | |
|---|---|---|
| 1,526,782 | Fleischer | Feb. 17, 1925 |
| 1,951,777 | Siegler et al. | Mar. 20, 1934 |
| 2,329,064 | Lorant | Sept. 7, 1943 |
| 2,428,861 | Waring et al. | Oct. 14, 1947 |
| 2,671,007 | Crouch | Mar. 2, 1954 |